United States Patent Office 2,729,645

Patented Jan. 3, 1956

2,729,645

1-[2-(DITHIOCARBOXYAMINO)POLYMETHYLENE] QUATERNARY AMMONIUM INNER SALTS

Hein L. Klopping, Wilmington, Del., assignor to E. I. du Pont de Nemours and Company, Wilmington, Del., a corporation of Delaware No Drawing. Application September 8, 1952, Serial No. 308,529

6 Claims. (Cl. 260—294.8)

This invention relates to 1-[2-(dithiocarboxyamino)-polymethylene]-quaternary ammonium inner salts and their hydrates and to methods for their preparation.

The 1-[2-(dithiocarboxyamino)polymethylene]-quaternary ammonium inner salts of the invention are represented by the formula (1) 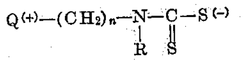

where $Q^{(+)}$ is a quaternary ammonium radical, R is hydrogen or a lower alkyl radical and $n$ is an integer from 1 to 3.

As will be seen from Formula 1, the compounds are mono- or dialkyl substituted dithiocarbamic acid inner salts containing a quaternary ammonium radical attached to the alkyl chain. The quaternary ammonium radical is preferably pyridinium, or a trialkylammonium radical. Compounds containing a trimethylammonium group are particularly preferred.

Illustrative of the compounds of my invention are:

1-[2-(dithiocarboxyamino)ethyl]-pyridinium inner salt
2-(dithiocarboxymethylamino)ethyl trimethylammonium inner salt
2-(dithiocarboxymethylamino)ethyl triethylammonium inner salt
2-(dithiocarboxyethylamino)ethyl tri-n-butylammonium inner salt
2-(dithiocarboxyisopropylamino)ethyl trimethylammonium inner salt
3-(dithiocarboxymethylamino)propyl trimethylammonium inner salt
Dithiocarboxymethylamino-n-butyl trimethylammonium inner salt A method for preparing the compounds of Formula 1 where R is hydrogen can be diagrammaticaly represented as follows:

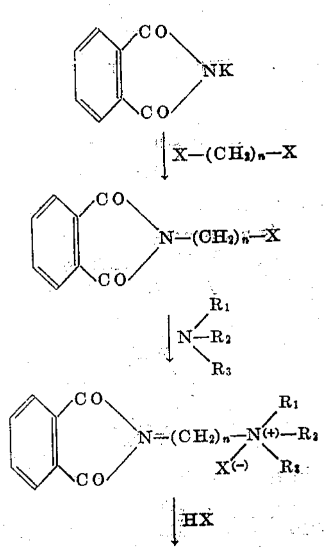

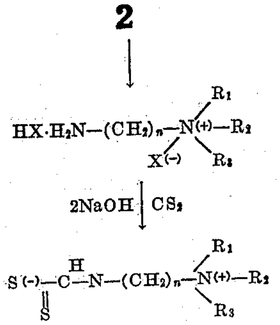

where X is chlorine or bromine, $n$ is an integer of from 1 to 3, and $R_1$, $R_2$ and $R_3$ are the same or different and each represents a lower alkyl radical. Jointly $R_1$, $R_2$ and $R_3$ can represent a radical having the structural formula

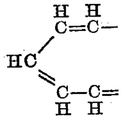

The starting material for the above synthesis is the potassium salt of phthalimide. Phthalimide is readily formed by the action of ammonia on warm phthalic anhydride. It has weak acidic properties and forms a potassium salt with potasium hydroxide.

The potassium salt of phthalimide is reacted with an alpha,omega-dihaloalkane to yield an omega-halopolymethylenephthalimide. The latter compound is then reacted with a tertiary amine such as, for instance, pyridine, trimethylamine, and the like. The resulting phthalimidopolymethylene quaternary ammonium halide is treated with a hydrogen halide, preferably HCl or HBr, to give omega-aminopolymethylene quaternary ammonium halide hydrohalide. Reaction between the latter compound and carbon disulfide is effected in an alkaline medium to yield the desired 1-[2-(dithiocarboxyamino)polymethylene]quaternary ammonium inner salt.

An alternative method for preparing the compounds of my invention can be represented by the following equations:

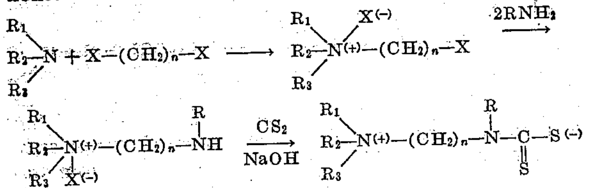

where X is chlorine or bromine, R is hydrogen or lower alkyl, $n$ is an integer of from 1 to 3, and $R_1$, $R_2$ and $R_3$ are the same or different and each represents a lower alkyl radical. Jointly $R_1$, $R_2$ and $R_3$ can represent a radical of the formula

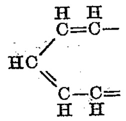

This alternative synthesis is illustrated by Example 2 which follows. A tertiary amine such as, for instance, trimethylamine, triethylamine, pyridine, is reacted with an alpha,omega-dihaloalkane. The resulting quaternary ammonium polymethylene halide salt is reacted with ammonia or a primary amine to give a compound of the formula (2) 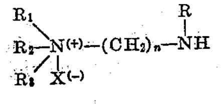

The compound represented by Formula 2 is reacted with carbon disulfide in an alkaline medium to give an inner salt of the present invention.

The 1-[2-dithiocarboxyamino)polymethylene] - quaternary ammonium inner salts of the invention are highly potent fungicides having negligible phytotoxicity. They are particularly well suited for application in plant disease control. The compounds of the invention exhibit satisfactory solubility properties and, as they contain no heavy metal ions, are free from the inherent chronic toxicity of metal ions present in many of the fungicides of the prior art.

In order to better understand my invention, reference should be had to the following illustrative examples:

*Example 1*

Preparation of 1-[2-(dithiocarboxyamino)ethyl]-pyridinium inner salt, monohydrate

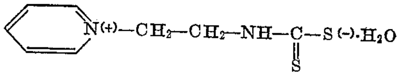

Phthalimidoethyl pyridinium bromide is prepared by heating a mixture of 50 g. of beta-bromoethylphthalimide and 30 ml. of dry pyridine on the steam bath for a period of two hours. The crystal crust obtained is ground in a mortar, washed with ether and recrystallized from alcohol. The product, phthalimidoethyl pyridinium bromide, M. P. 240–241° C. is obtained in a yield of 50 grams.

A mixture consisting of 41 grams of phthalimidoethyl pyridinium bromide and 320 ml. of 24% HBr solution is refluxed for a period of seven hours. The mixture is cooled and phthalic acid is filtered off. The filtrate is collected and evaporated to dryness in vacuo. The crystalline residue which is predominantly beta-aminoethyl pyridinium bromide hydrobromide is taken up in water, filtered, and the filtrate is again evaporated to dryness. The resulting solid residue is ground in a mortar with acetone, filtered, washed with acetone and dried. After recrystallization from methanol the hydrobromide melts at 211.5°–213.5° C. and weighs 30 grams.

A solution of 17.0 g. of beta-aminoethyl pyridinium bromide hydrobromide in 80 ml. of water is mixed with a solution of 4.8 g. of sodium hydroxide in 40 ml. of water. While the reaction mixture is stirred, 4.6 g. of carbon disulfide is added to the mixture over a period of one hour. Stirring is continued until the reaction mixture no longer contains free $CS_2$. The orange solution is evaporated to a small volume in vacuo, sodium bromide is filtered off, and the filtrate is collected. The filtrate is then treated with a large excess of acetone and left in a refrigerator overnight. Ten grams of orange crystals are obtained, which after recrystallization from water at a temperature of 50° C. give large yellow crystals of 1-[2 - (dithiocarboxyamino)ethyl] - pyridinium inner salt monohydrate. This product melts at 149–151° C. with decomposition, and weighs 5.5 grams.

*Analysis.*—Calculated for $C_8H_{12}ON_2S_2$: C, 44.41; H, 5.59; N, 12.95; S, 29.65. Found: C, 44.32; H, 5.66; N, 12.90; S, 29.83.

*Example 2*

Preparation of 2-(dithiocarboxymethylamino)ethyl trimethylammonium inner salt

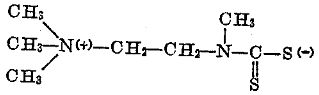

A solution of 660 grams of trimethylamine in 2 liters of absolute alcohol is mixed with 1109 grams of 1,2-dichloroethane. The mixture is allowed to stand at room temperature for a period of ten days. The crystals formed are filtered with suction and collected. They are very hygroscopic and weigh 240 grams. The filtrate is refluxed on the steam bath for a period of eight hours, ice water being led through the reflux condenser. Then the alcohol is distilled off under a vacuum, and the resulting crystalline residue consisting of choline dichloride is recrystallized from alcohol. Total yield of choline dichloride is 400 grams.

The choline dichloride is dissolved in absolute alcohol and mixed with an excess of a 33% solution of methyl amine in absolute alcohol. The mixture is allowed to stand at room temperature for a period of 14 days. The resulting yellow solution is then heated on a steam bath and subsequently evaporated to dryness in a vacuum. The strongly colored crystalline residue is fractionally recrystallized from absolute alcohol. Methylamine hydrochloride crystallizes first. The product, trimethylaminoethylmethylamine chloride, whose formula is shown below, is obtained in the form of very fine white crystals.

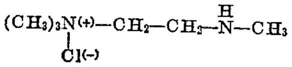

A solution of 152 g. of trimethylaminoethylmethylamine chloride in 700 ml. of water is mixed with a solution of 40 g. of sodium hydroxide in 200 ml. of water. The mixture is stirred while 76 g. of carbon disulfide is added dropwise. Stirring of the mixture is continued until free carbon disulfide is no longer present in the reaction system. The orange reaction mixture is evaporated to a small volume in a vacuum. Sodium chloride is removed by fractional recrystallization. The desired product, 2-(dithiocarboxymethylamino)ethyl trimethylammonium inner salt, is washed with acetone and dried.

I claim:

1. A compound of the group consisting of inner salts of the formula

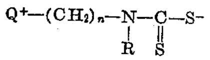

and hydrates of said salts, where Q is a member of the class consisting of tri(lower alkyl)ammonium and pyridinium groups, R is a member of the group consisting of hydrogen and lower alkyl, and *n* is an integer of from 1 to 3.

2. 1-[2-(dithiocarboxyamino)ethyl]pyridinium inner salt, monohydrate.

3. 2 - (dithiocarboxymethylamino)ethyl trimethylammonium inner salt.

4. A process comprising the step of reacting carbon disulfide in an alkaline medium with a substance selected from the group consisting of a compound having the formula

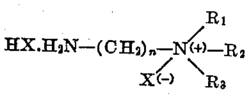

and a compound having the formula

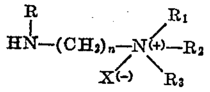

where X is a halogen of the group consisting of chlorine and bromine; R is a member of the group consisting of hydrogen and lower alkyl; $R_1$, $R_2$ and $R_3$ each represent lower alkyl and jointly represent a trivalent radical of the formula

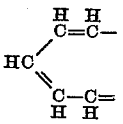

and *n* is an integer of from 1 to 3.

5. In a process for preparing 1-[2-dithiocarboxyamino)ethyl]-pyridinium inner salt, monohydrate, the steps comprising reacting beta-aminoethyl pyridinium bromide hydrobromide with carbon disulfide in an alkaline medium, and recovering the 1-[2-(dithiocarboxyamino)ethyl]-pyridinium inner salt, monohydrate, thus produced.

6. In a process for preparing 2-(dithiocarboxymethylamino)ethyl trimethylammonium inner salt, the step comprising reacting trimethylaminoethylmethylamine chloride with carbon disulfide in the presence of caustic to obtain 2-(dithiocarboxymethylamino)ethyl trimethylammonium inner salt.

No references cited.